United States Patent [19]

Watanabe et al.

[11] Patent Number: 5,000,534
[45] Date of Patent: Mar. 19, 1991

[54] OPTICAL SWITCH

[75] Inventors: Yasuyuki Watanabe; Koichiro Iwao, both of Osaka; Akira Nikaido; Yoshio Wada, both of Saitama, all of Japan

[73] Assignees: Nippon Sheet Glass Co., Ltd.; Citizen Watch Co., Ltd., both of Tokyo, Japan

[21] Appl. No.: 446,434

[22] Filed: Dec. 5, 1989

[30] Foreign Application Priority Data

Dec. 5, 1988 [JP] Japan .................... 63-307433
Dec. 28, 1988 [JP] Japan .................... 63-329188
Apr. 7, 1989 [JP] Japan .................... 1-89432

[51] Int. Cl.⁵ .................... G02B 6/36; G02B 7/26
[52] U.S. Cl. .................... 350/96.20; 350/96.15
[58] Field of Search .................... 350/96.15, 96.20

[56] References Cited

U.S. PATENT DOCUMENTS

| | | | |
|---|---|---|---|
| 4,669,817 | 6/1987 | Mori | 350/96.15 |
| 4,705,349 | 11/1987 | Reedy | 350/96.15 |
| 4,834,488 | 5/1989 | Lee | 350/96.15 |
| 4,854,658 | 8/1989 | Stanley | 350/96.15 |

*Primary Examiner*—William L. Sikes
*Assistant Examiner*—Robert E. Wise
*Attorney, Agent, or Firm*—Irving M. Weiner; Joseph P. Carrier; Pamela S. Burt

[57] ABSTRACT

An optical switch includes at least one optical fiber exit terminal disposed in a plane, at least first and second optical fiber entrance terminals disposed in the plane, and a movable reflector disposed in the plane and angularly movable about a point in the plane for reflecting and/or refracting a light ray from the optical fiber exit terminal selectively into one of the first and second optical fiber entrance terminals for thereby optically coupling the optical fiber exit terminal and said one optical fiber entrance terminal. When the optical fiber exit terminal and the optical fiber entrance terminal are optically coupled to each other, the movable reflector is held against a stopper while it is being subjected to a certain torque, so that the movable reflector is stably stopped.

19 Claims, 15 Drawing Sheets

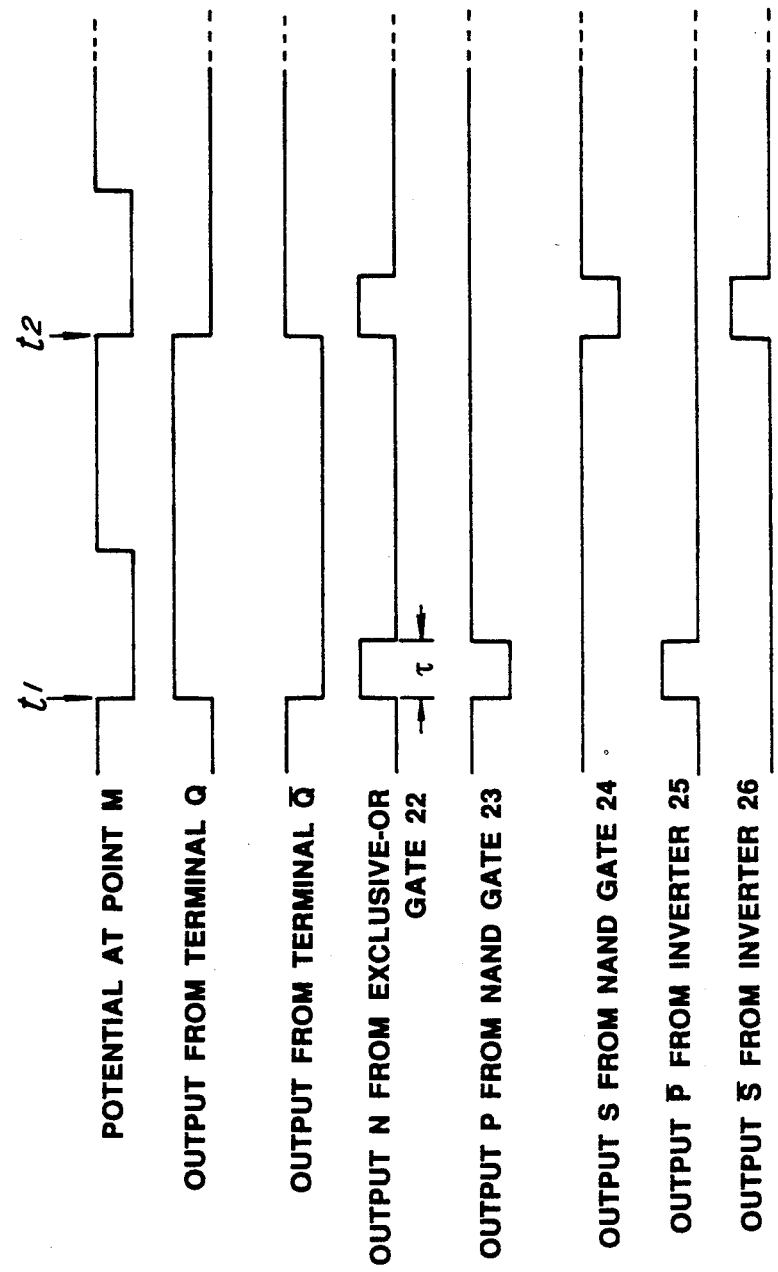

OPTICAL SWITCH

BACKGROUND OF THE INVENTION

1. Field of the Invention:

The present invention relates to an optical switch for selecting alternate light paths between or optically coupling and decoupling optical fibers for use in optical fiber communications.

2. Description of the Relevant Art:

One conventional optical switch, as disclosed in Japanese Laid-Open Patent Publication No. 56(1981)-107201, for example, comprises a rectangular prism positioned at the entrance/exit ends of three optical fibers arranged side by side in one plane. The rectangular prism is reciprocally movable in that plane in linear directions normal to the optical axes of the optical fibers, so that the optical fibers can be optically coupled and decoupled.

Japanese Laid-Open Patent Publication No. 55(1980)-142304 discloses, as shown in FIG. 21 of the accompanying drawings, three juxtaposed optical fibers 101, 102, 103 and a rectangular prism 104 coupled to a rotatable shaft 110 coaxial with the central optical fiber 101. The central optical fiber 101 can be optically coupled to either the optical fiber 102 or the optical fiber 103 by turning the rectangular prism 104 through 180° on and about the shaft 110 in a plane normal to the plane in which the optical fibers 101, 102, 103 lie.

With the former optical switch, since the rectangular prism is linearly reciprocally moved perpendicularly to the optical fibers for light path coupling and decoupling, the inertial force which is applied to the rectangular prism when it is stopped is oriented in the same direction as the direction in which the rectangular prism is adjusted with respect to the optical axes of the optical fibers. Therefore, the adjusted position of the rectangular prism may be subjected to an error depending on the way in which the optical switch is used. For example, if the prism is displaced $\Delta d$ from its adjusted position, then the distance between the axis of a light ray incident upon the prism and the axis of a light ray reflected from the prism will vary by $\Delta d \times 2$. Depending on how the prism is mounted, the prism is affected by gravity, and it takes different times to switch from one light path to the other and to switch from the other light path back to the one light path.

The latter optical switch takes a relatively long switching time and hence has a low switching speed since the prism 104 is required to turn 180° for light path coupling and decoupling.

In each of the above conventional mechanical optical switches, because the entrance/exit end surfaces of the optical fibers are disposed parallel to the entrance/exit end surface of the prism, the exit end surfaces of the optical fibers and the prism tend to be affected by reflected light rays.

FIGS. 22(a) and 22(b) of the accompanying drawings show an optical switch disclosed in Japanese Patent Publication No. 62(1987)-56490. The disclosed optical switch includes four juxtaposed optical fibers 201, 202, 203, 204 lying in one plane, the fibers being disposed in coaxial confronting relation in two pairs. A polygonal prism is positioned so as to face the entrance/exit ends, i.e., input/output terminals, of these optical fibers. By turning the polygonal prism from the position of FIG. 22(a) to the position of FIG. 22(b), the optical fibers 201, 204 are optically decoupled and the optical fibers 201, 202 are optically coupled, and at the same time, the optical fibers 203, 202 are optically decoupled and the optical fibers 203, 204 are optically coupled. The polygonal prism has however its own disadvantages. For example, it causes a loss of light energy due to interfacial reflections. The polygonal prism is heavy and hence poor in its response to switching commands on account of large inertia thereof. As a result, the switching speed of the optical switch is low.

SUMMARY OF THE INVENTION

In view of the aforesaid shortcomings of the conventional optical switches, it is an object of the present invention to provide an optical switch which can optically couple and decouple optical fibers reliably and stably at all times.

According to the present invention, there is provided an optical which includes at least one optical fiber exit terminal disposed in a plane, at least first and second optical fiber entrance terminals disposed in the plane, and a movable reflector disposed in the plane and angularly movable about a point in the plane for reflecting and/or refracting a light ray from the optical fiber exit terminal selectively into one of the first and second optical fiber entrance terminals for thereby optically coupling the optical fiber exit terminal and said one optical fiber entrance terminal. When the optical fiber exit terminal and the optical fiber entrance terminal are optically coupled to each other, the movable reflector is held against a stopper while it is being subjected to a certain torque, so that the movable reflector is stably stopped.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 12(b) is a timing chart of operation of the driver circuit shown in FIG. 12(a);

DETAILED DESCRIPTION OF THE PREFERRED EMBODIMENTS

Figure 2:
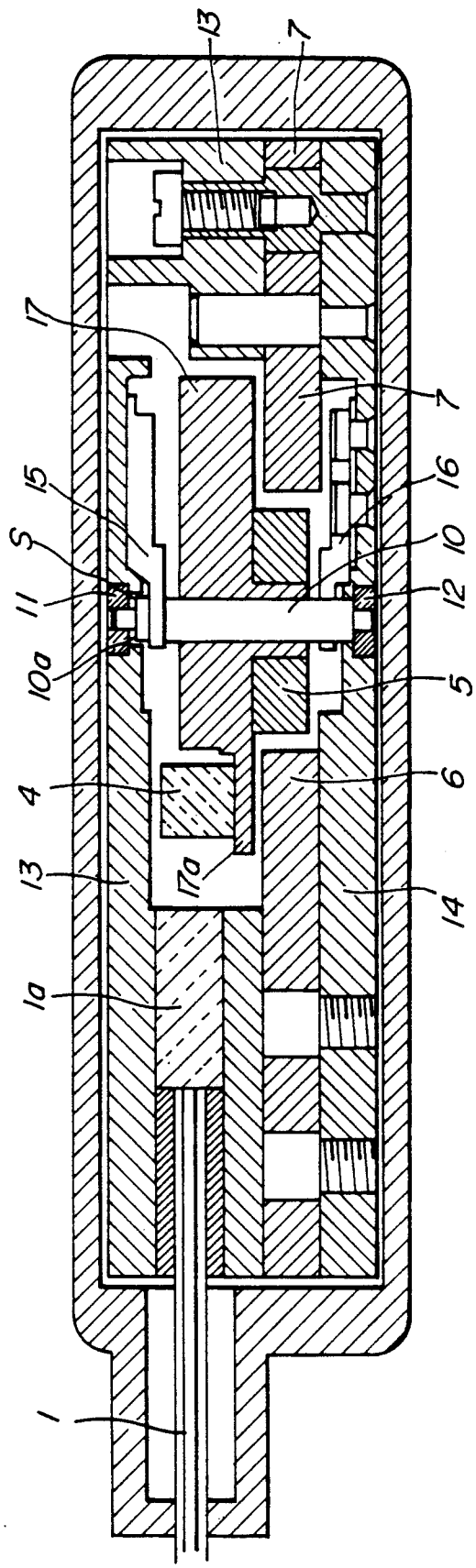
FIG. 2 is a vertical cross-sectional view of the optical switch shown in FIG. 1.
Figure 3:
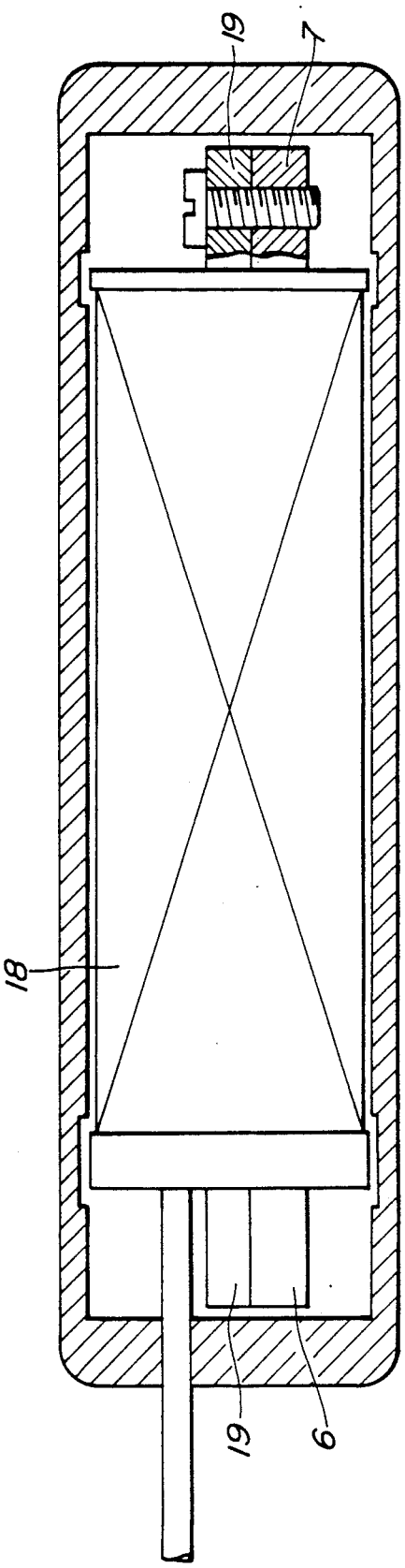
FIG. 3 is another vertical cross-sectional view of the optical switch shown in FIG. 1.
Figure 4:
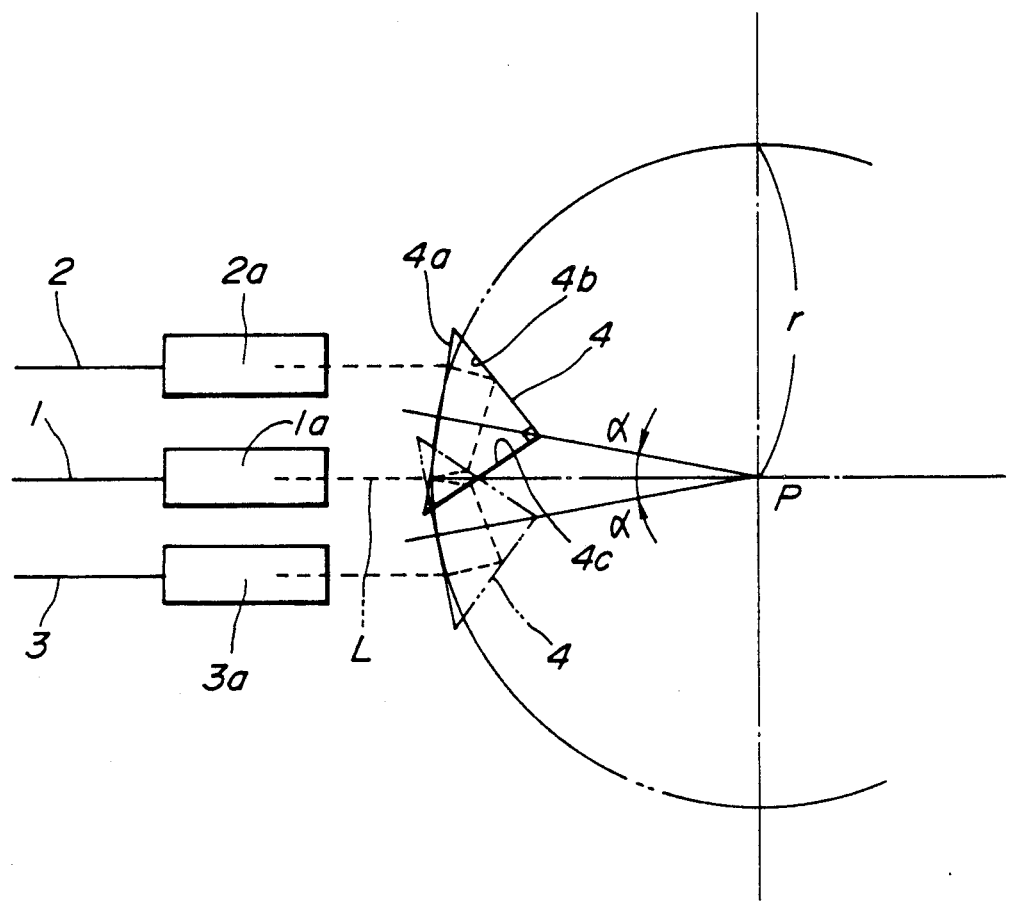
FIG. 4 is a diagram schematically showing the principles of operation of the optical switch shown in FIG. 1.
Figure 5:
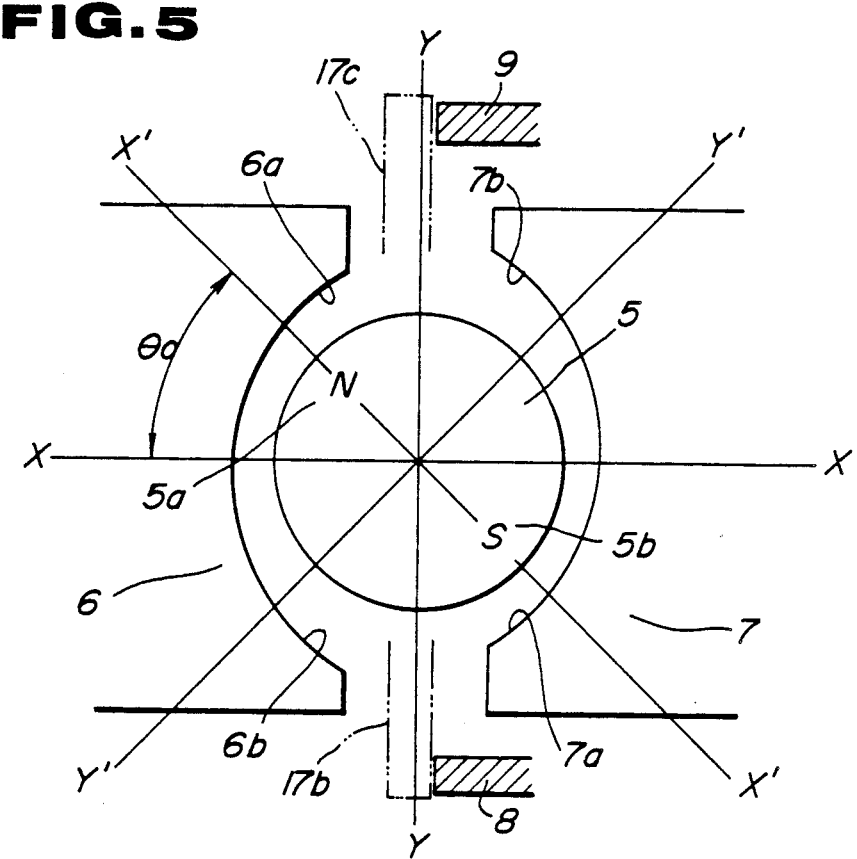
FIG. 5 is a schematic cross-sectional view of an electromagnetic actuator used in the optical switch shown in FIG. 1.
Figure 6:
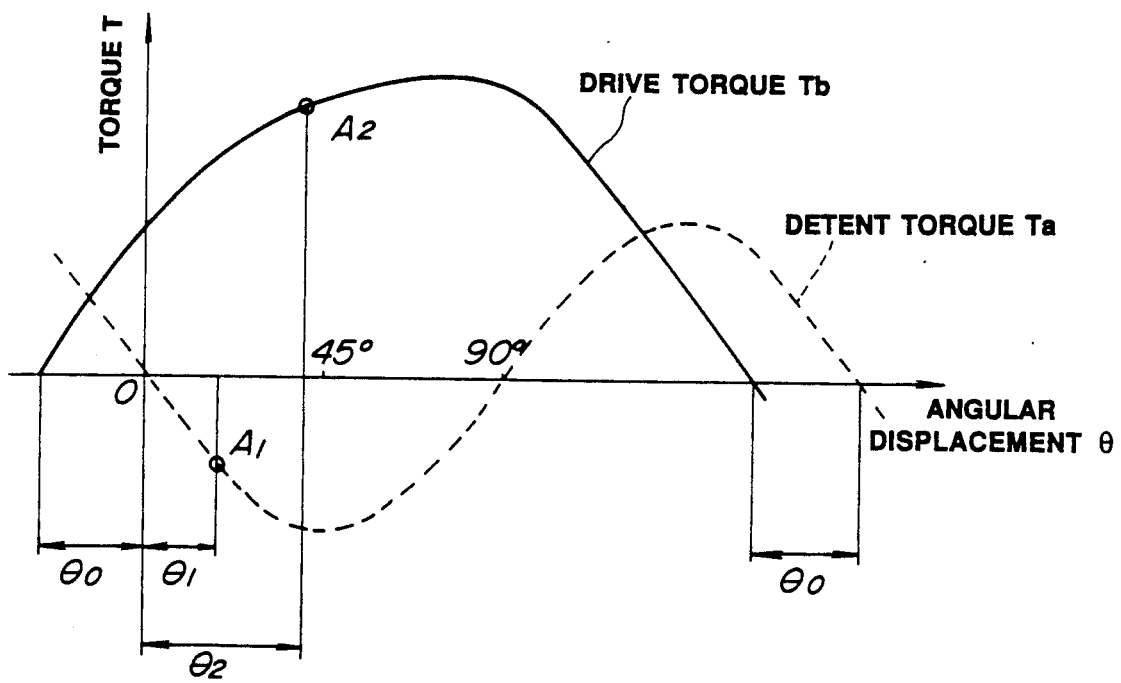
FIG. 6 is a graph showing the relationship between the angular displacement of a rotor in the actuator shown in FIG. 5, the detent torque applied to the rotor, and the drive torque applied to the rotor.

FIGS. 1 through 6 show an optical switch according to a first embodiment of the present invention. The principles of operation of the optical switch of the first embodiment are schematically shown in FIGS. 4 through 6.

As shown in FIG. 4, the optical switch has at least three optical fibers 1, 2, 3 juxtaposed in one plane. The first, second, and third optical fibers 1, 2, 3 have entrance/exit terminals to which there are attached respective fiber collimators 1a, 2a, 3a for converting divergent light rays to parallel light rays or parallel light rays to convergent light rays. The fiber collimators 1a, 2a, 3a are in the form of graded-index lenses, and juxtaposed in the same plane as that in which the optical fibers 1, 2, 3 are positioned. The optical switch also has a movable reflector including a rectangular prism 4 positioned in confronting relation to the fiber collimators 1a, 2a, 3a and disposed in the same plane as that in which the optical fibers 1, 2, 3 are disposed. The rectangular prism 4 has an entrance/exit surface 4a, a first reflecting surface 4b, and a second reflecting surface 4c. The rectangular prism 4 is angularly movable or swingable about a point P in the above plane. When the rectangular prism 4 is angularly moved, the entrance/exit surface 4a follows an arcuate path which is part of a circle having a radius r. The rectangular prism 4 is swingable about the point P in an angular range of about α on each side of the optical axis L of the central optical fiber 1 which extends through the point P. When the rectangular prism 4 is angularly moved to one side through the angle α and stopped at its stroke end as indicated by the solid lines in FIG. 4, the rectangular prism 4 optically couples the first and second optical fibers 1, 2 to each other. When the rectangular prism 4 is angularly moved to the other side through the angle α and stopped at it stoke end as indicated by the broken lines, the rectangular prism 4 optically couples the first and third optical fibers 1, 3 to each other.

In the first embodiment, the rectangular prism 4 is angularly moved by a drive torque produced under magnetic forces by an electromagnetic transducer actuator including a permanent magnet and an electromagnet.

FIG. 5 schematically shows the electromagnetic transducer actuator. The electromagnetic transducer actuator includes a disc-shaped rotor 5 comprising a permanent magnet for angularly moving the rectangular prism 4, and electromagnetic stators 6, 7 disposed in confronting relation to each other with the rotor 5 positioned therebetween. The stators 6, 7 can be magnetized as desired by coils (described later on). The rotor 5 and the stators 6, 7 are spaced by progressively varying gaps such that they are spaced relatively closely at diametrically opposite stator regions 6a, 7a and relatively widely at other diametrically opposite stator regions 6b, 7b. Therefore, the magnetic field developed between the rotor 5 and the stators 6, 7 is most intensive near the stator regions 6a, 7a. Even when the stators 6, 7 are not magnetized by the coils, a torque (referred to as a "detent torque") tending to rotate the rotor 5 acts between the rotor 5 and the stators 6, 7, so that the N-pole 5a and the S-pole 5b of the rotor 5, which are diametrically opposite to each other across the central axis, of the rotor 5, are forced to be aligned with the line X'—X' passing through the stator regions 6a, 7a. When the N-pole 5a and the S-pole 5b of the rotor 5 are aligned with the line X'—X', the detent torque applied to the rotor 5 becomes zero. In this position, the rotor 5 is stably held at rest with respect to the stators 6, 7.

FIG. 6 shows a broken-line curve Ta indicative of the detent torque acting on the rotor 5 depending on the angular displacement θ of the rotor 5. When the N-pole 5a and the S-pole 5b of the rotor 5 are aligned with the line X'—X' as shown in FIG. 5, the angle θ of the rotor 5 in the stable rest position is referred to as a reference angular position (0) with respect to the stators 6, 7. FIG. 6 also shows a solid-line curve Tb indicative of a drive torque applied to the rotor 6 when the coils are energized to magnetize the stators 6, 7, the drive torque depending on the angular displacement θ from the reference angular position of the rotor 5. In FIG. 6, it is assumed that the positive torque acts to rotate the rotor 5 clockwise and the negative torque acts to rotate the rotor 5 counterclockwise. In the angular range of 0°<-θ<90°, when the stators 6, 7 are not magnetized, only the detent torque is applied to the rotor 5 and the applied detent torque is negative. Therefore, the rotor 5 tends to rotate counterclockwise to the stable rest position 0. In the same angular range, when the stators 6, 7 are magnetized, however, the drive torque Tb is generated in excess of the detent torque Ta, so that the rotor 5 tends to rotate clockwise.

The optical switch also includes a first stopper 8 for angularly limiting the rotor 5 so that its angular displacement θ does not become θ≦θ1 (θ1: first limit angle) in the angular range of 0°<θ<90°, and a second stopper 9 for angularly limiting the rotor 5 so that its angular displacement $\theta$ does not become $\theta \geq \theta_2$ ($\theta_2$: second limit angle) in the same angular range, as indicated by the imaginary lines in FIG. 5. When the stators 6, 7 are not magnetized, the rotor 5 is turned counterclockwise by the detent torque Ta and a portion 17b of the rotor 5 is forcibly held against the first stopper 8 at an angular position (corresponding to a point A1 in FIG. 6) slightly prior to the stable rest position (corresponding to the point 0 in FIG. 6), whereupon the rotor 5 is brought to a stop. When the stators 6, 7 are magnetized, the rotor 5 is turned clockwise by the drive torque Tb and a portion 17c of the rotor 5 is forcibly held against the second stopper 9 at a certain angular position (corresponding to a point A2 that is smaller than 45° in FIG. 6), whereupon the rotor 5 is stopped. Therefore, the rotor 5 is stably held in its stop positions irrespective of whether it is turned clockwise or counterclockwise.

In this embodiment, the angular range of $\theta_2 - \theta_1$ ($= 2\alpha$), i.e., the angle through which the rotor 5 is angularly movable, is 20°.

Figure 7:
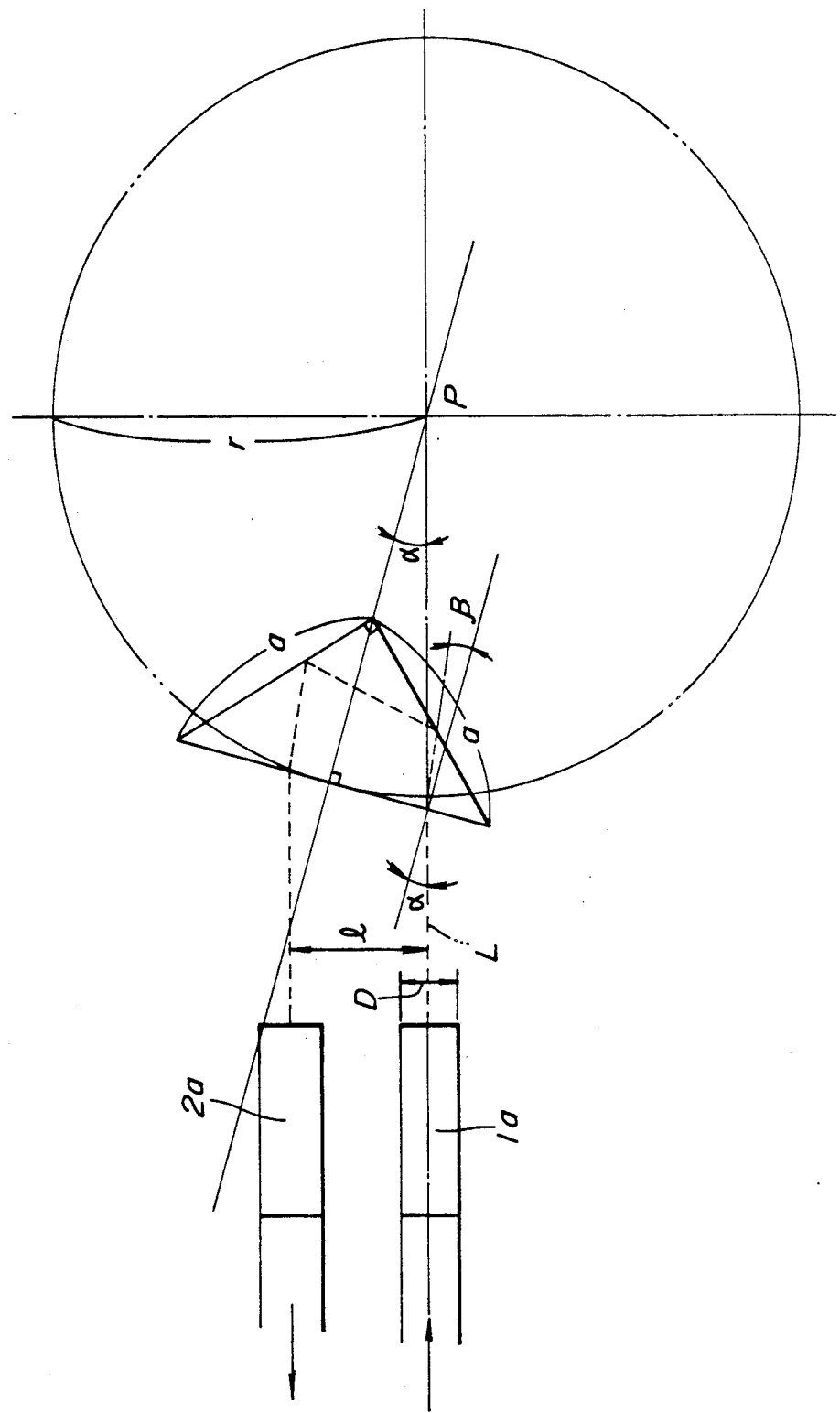
FIG. 7 is a schematic diagram illustrating various parameters of an optical switch according to a second embodiment of the present invention.

Using parameters shown in FIG. 7, various dimensions of the fiber collimators 1a, 2a, 3a and the rectangular prism 4, and the radius r of the angular displacement of the prism 4 are given by the following equations:

$$l = 2 \cdot r \cdot \sin\alpha - \sqrt{2} \cdot \tan\beta \cdot \cos\alpha \quad (1)$$

$$l - D > 0 \quad (2)$$

$$\sqrt{2} \cdot a \cdot \cos\alpha \cdot (1 - \tan\beta) > D + l \quad (3)$$

$$n \cdot \sin\left(\frac{\pi}{4} - \beta\right) > 1 \quad (4)$$

where $\alpha$ is the angular displacement of the rectangular prism 4 with respect to the optical axis L and also the angle of incidence of light upon the rectangular prism 4, a is the length of each of the two legs from the right-angled corner of the rectangular prism 4, l is the interaxial distance between adjacent two of the optical fibers, $\beta$ is the refraction angle through which light incident upon the prism 4 is refracted, n is the refractive index of the prism 4, and D is the width of a light ray from the optical fiber.

The equation (4) is indicative of a condition for total reflection within the prism 4. Therefore, if the movable reflector is in the form of a mirror or the like instead of the prism, then the equation (4) is not required.

Figure 8:
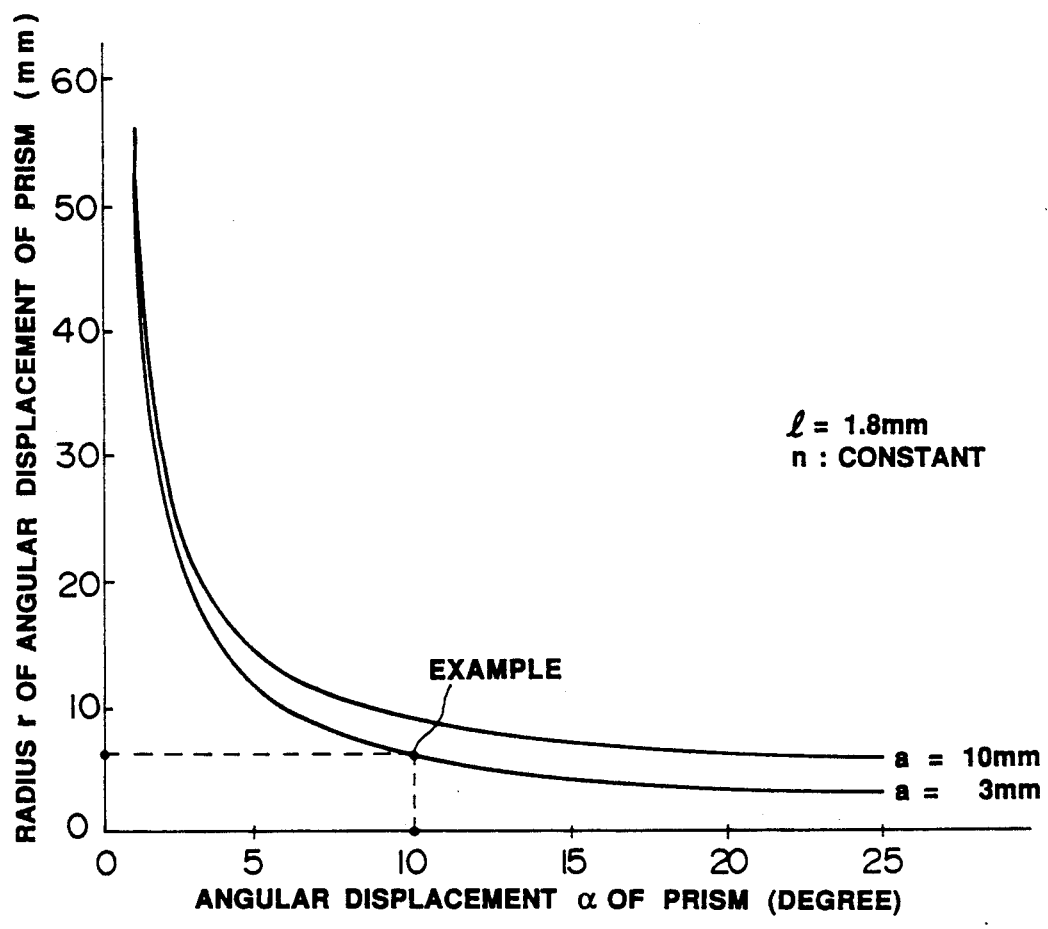
FIG. 8 is a graph showing the relationship between the angular displacement o of the prism and the radius r of the angular displacement of the prism, among the parameters shown in FIG. 7.
Figure 9:
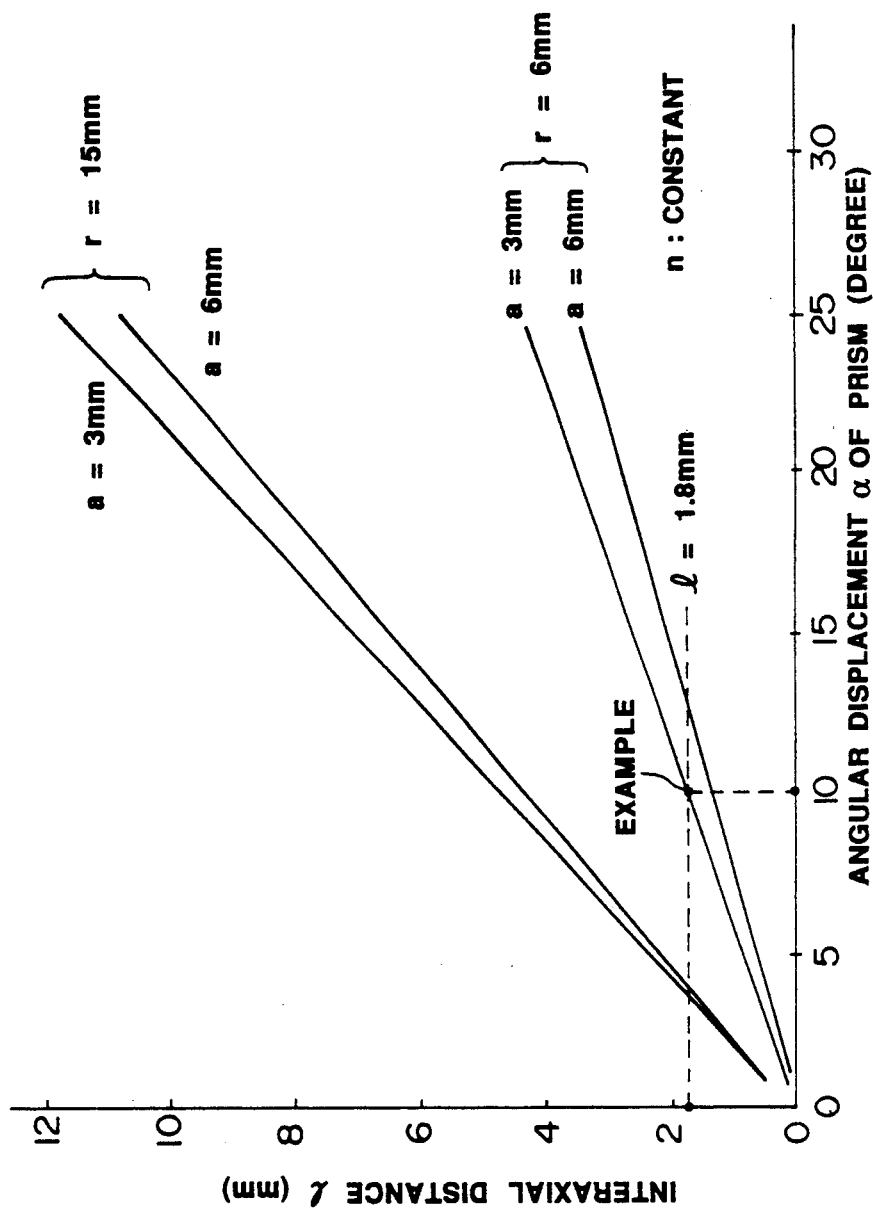
FIG. 9 is a graph showing the relationship, under particular conditions, between the angular displacement $\alpha$ of the prism and the interaxial distance l, among the parameters shown in FIG. 7.
Figure 10:
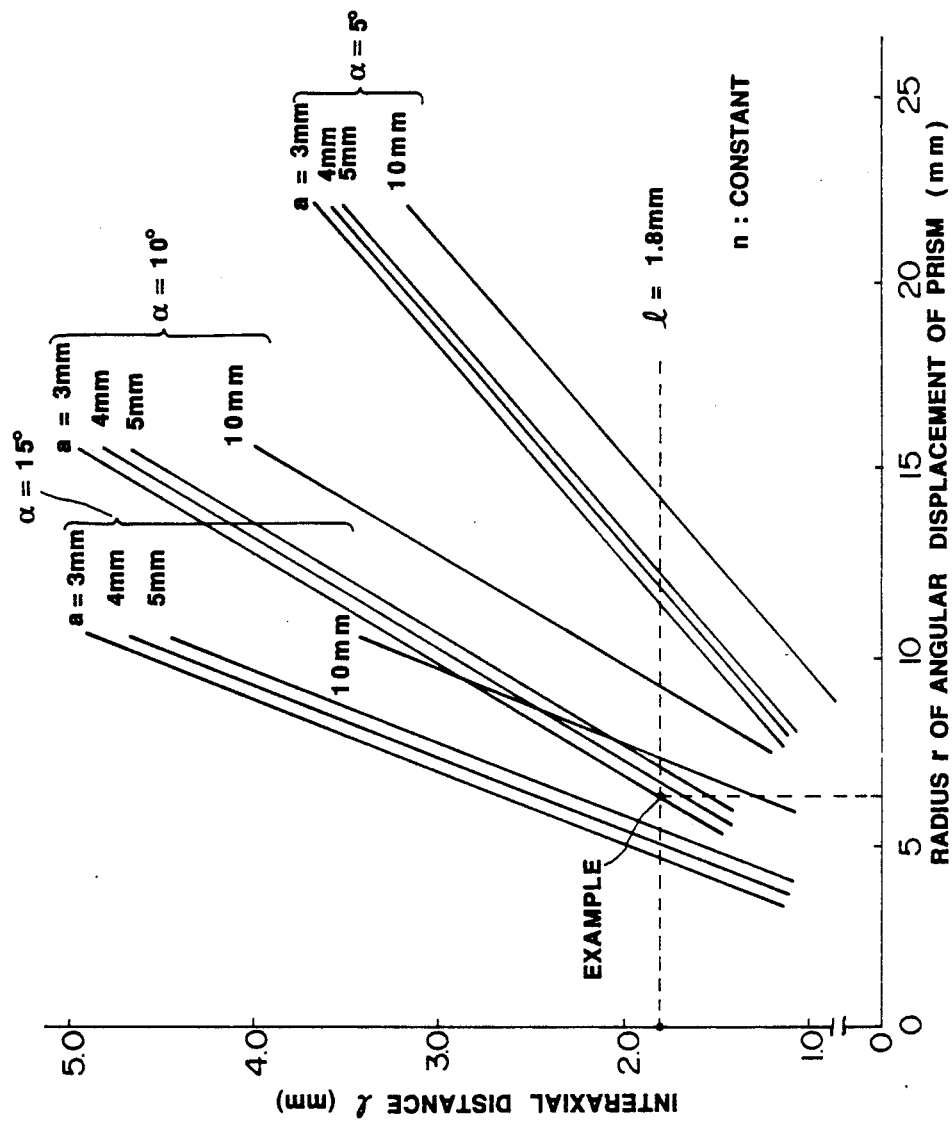
FIG. 10 is a graph showing the relationship, under other particular conditions, between the angular displacement α of the prism and the interaxial distance l, among the parameters shown in FIG. 7.

FIGS. 8 through 10 show the relationship between the parameters of the equation (1). FIG. 8 shows the relationship between the radius r of the angular displacement and the angular displacement $\alpha$ of the prism 4 with respect to two values for the parameter a (a=10 mm and a=3 mm). FIG. 9 shows the relationship between the interaxial distance l and the angular displacement $\alpha$ with respect to particular values for the radius r and the length a of the legs of the prism 4. FIG. 10 illustrates the relationship between the interaxial distance l and the radius r with respect to particular values for the angular displacement $\alpha$ and the length a. In each of FIGS. 8 through 10, preferable dimensions are indicated by dotted lines.

Figure 1:
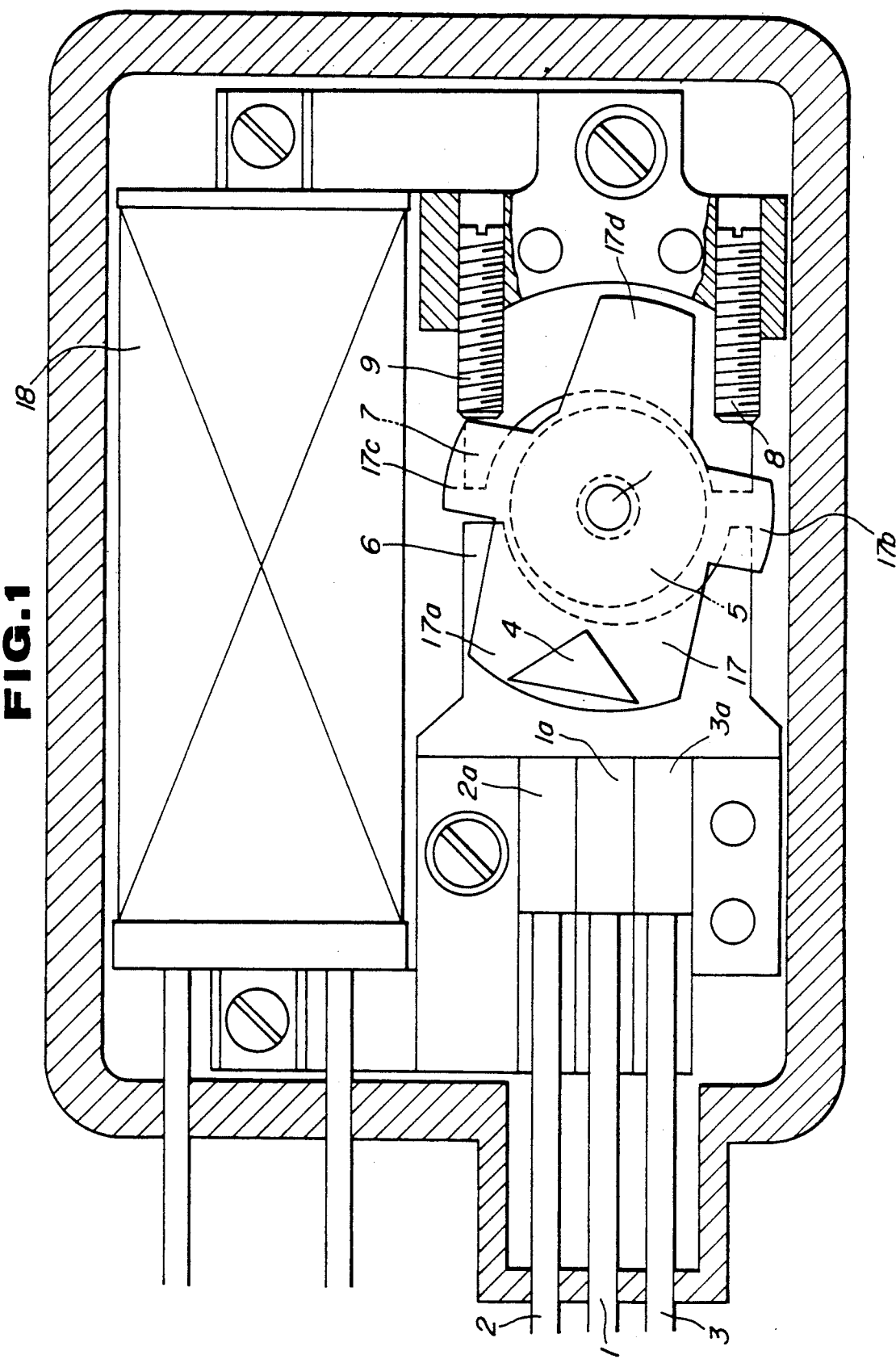
FIG. 1 is a plan view, partly in cross section, of an optical switch according to a first embodiment of the present invention.

The optical switch will be described in detail with reference to FIGS. 1 through 3. The rectangular prism 4 is mounted on a rotatable shaft 10 having upper and lower ends which are rotatably supported on upper and lower plates 13, 14 by respective upper and lower bearings 11, 12. A small gap or clearance S is defined between the upper bearing 11 and an upper end surface 10a of the shaft 10. The shaft 10 is biased at upper and lower end portions thereof by springs 15, 16 so that the central axis of the shaft 10 will not be displaced by any play in the bearings 11, 12. Therefore, the shaft 10 can be rotated about its own axis stably and smoothly without axial displacement.

A support 17 on which the rectangular prism 4 is supported is fixedly mounted on the shaft 10. The rotor 5 is fixed to the lower surface of the support 17. The support 17 is in the form of an aluminum plate so that it is lightweight. The support 17 has a front support wing 17a with the rectangular prism 4 placed thereon, and a rear tongue 17d projecting radially outwardly in diametrically opposite relation to the front support wing 17a so that the entire support 17 is kept in balance as a whole with respect to the shaft 10. The portions 17b, 17c, which double as counterweights, are disposed on opposite lateral sides of the support 17 for abutment against the first and second stops 8, 9. Since the rotor 5 is attached to the lower surface of the support 17, the rotor 5 can easily be installed in position and is positioned highly accurately. The movable reflector assembly including the support 17, the prism 4, and the rotor 5 has its center of gravity positioned substantially on the shaft 10. Therefore, the initial force applied to the movable reflector when it is stopped in either of the stop positions is uniformized, and the movable reflector is subject to a minimum positional error in the stop positions.

The stators 6, 7, which are positioned in surrounding relation to the rotor 5, are slightly displaced downwardly with respect to the rotor 5 for thereby urging the shaft 10 downwardly at all times. Accordingly, the shaft 10 undergoes no axial play, and can be rotated stably and smoothly. The stators 6, 7 are electromagnetic stators which can be magnetized when a coil 18 is energized. The stators 6, 7 are attached to a yoke 19 extending through the coil 18. Therefore, the stators 6, 7 and the yoke 19 jointly make up a magnetic loop.

The stoppers 8, 9 comprise screws threaded in the upper plate 13. Consequently, the stop positions for the support 7, i.e., the angular limit positions for the rotor 5, can easily be adjusted by turning the stoppers 8, 9.

With the optical switch of the first embodiment, as described above, since the movable reflector with its center of gravity positioned on the rotatable shaft is angularly movable in the same plane as that in which the optical fibers are arranged for optically coupling and decoupling the optical fibers, the movable reflector does not depend upon the direction in which the gravity acts on the movable reflector. As a result, there is no difference between the times required to switch from one light path to the other light path and to switch from the other light path to said one light path. The switching time is also small as the the prism 4 is required to swing through a small angle of 20° for such light path switching. Moreover, since the entrance/exit surface of the prism 4 is inclined at the angle $\alpha$ to the incident light ray, the prism and the optical fibers do not suffer from light reflections.

In the first embodiment, the drive torque for swinging the movable reflector (including the rectangular prism 4) is produced by the electromagnetic transducer actuator including the permanent magnet and the electromagnet.

FIGS. 11 through 14 show an optical switch according to a second embodiment of the present invention, which incorporates a modified electromagnetic transducer actuator. The other details of the optical switch of the second embodiment are essentially the same as those shown in FIGS. 1 through 3.

Figure 11:
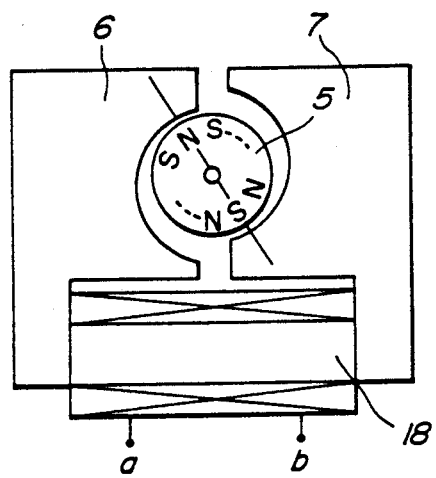
FIG. 11 is a schematic view of an electromagnetic actuator used in the optical switch of the second embodiment.

FIG. 11 schematically shows the modified electromagnetic transducer actuator. The rotor 5 disposed between the stators 6, 7 is in the form of a permanent magnet. However, the outer circumferential surface of the rotor 5 is magnetized into multiple magnetic poles, the number of which is expressed by $2p=2(2m-1)$ where p is the number of pole pairs and $m=1, 2, 3, \ldots$. In the illustrated modification, the rotor 5 has 14 magnetic poles. Therefore, the angle $\theta s$ of each incremental step of the rotor 5 is $\theta s = 360°/14 \approx 25.71°$.

Figure 12A:
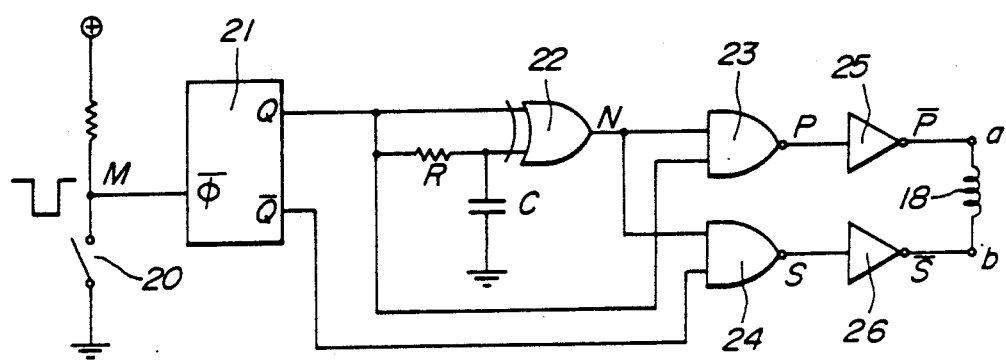
FIG. 12(a) is a block diagram of a driver circuit for the actuator shown in FIG. 11.

FIG. 12(a) shows a driver circuit for the actuator shown in FIG. 11, and FIG. 12(b) shows signals produced in the driver circuit. As shown in FIG. 12(a), the driver circuit basically has a switch 20 for turning on and off the power supply to operate the optical switch, a flip-flop 21, a resistor R, a capacitor C, an exclusive-OR gate 22, NAND gates 23, 24, inverters 25, 26, and the coil 18 of the stators 6, 7. Operation of the driver circuit will be described with reference to FIG. 12(b).

When the switch 20 is momentarily turned on at a time t1 in order to switch between the light paths, the potential at a point M drops to an "L" level, and output terminals Q, $\overline{Q}$ of the flip-flop 21 produce signals as shown in FIG. 12(b). The output signal from the output terminal Q is applied to one input terminal of the exclusive OR gate 22 and one input terminal of the NAND gate 23, and the output signal from the output terminal $\overline{Q}$ is applied to one input terminal of the NAND gate 24.

The other input terminal of the exclusive-OR gate 22 is supplied with the output signal from the output terminal Q of the flip-flop 21 through an integrator composed of the resistor R and the capacitor C. Therefore, the exclusive-OR gate 22 generates a pulse N having a pulse duration corresponding to a time constant $\tau$ which is determined by the resistor R and the capacitor C. The pulse N is applied to the other input terminals of the NAND gates 23, 24, which thus produce respective signals P, S as shown in FIG. 12(b). The signals P, S are inverted by the inverters 25, 26, respectively, into drive signals $\overline{P}$, $\overline{S}$ that are fed to the coil 18 of the actuator through respective terminals a, b. As a consequence, the stators 6, 7 are magnetized, and the rotor 5 is turned from a first stop position until it abuts against the second stopper 9 whereupon the rotor 9 is stably stopped in a second stop position.

When the switch 20 is momentarily turned on again at a time t2, drive signals P, S as shown in FIG. 12(b) are produced and sent to the coil 18 through the terminals a, b. The rotor 5 is then rotated back from the second stop position until it abuts against the first stopper 8 whereupon the rotor 5 is stably stopped in the first stop position.

Switching operation of the optical switch of the second embodiment will now be described in relation to torques produced by the modified actuator with reference to FIG. 13.

Figure 13:
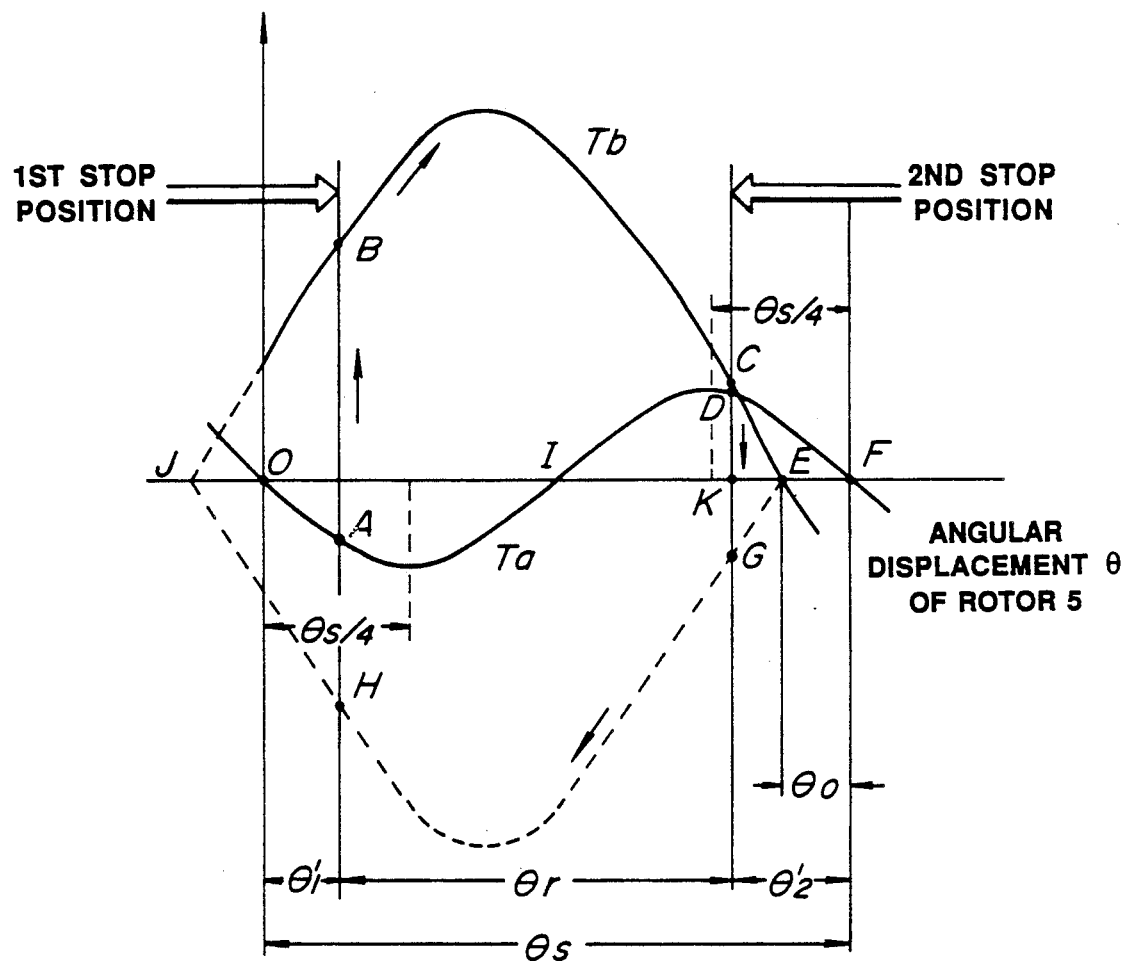
FIG. 13 is a graph showing the relationship between the angular displacement of a rotor in the actuator shown in FIG. 11, the detent torque applied to the rotor, and the drive torque applied to the rotor.

In FIG. 13, the curve Tb represents a drive torque generated when an electric current is supplied to the coil 18, and the curve Ta represents a detent torque generated when no electric current flows through the coil 18. Since the modified actuator of FIG. 11 employs the rotor which is magnetized into multiple magnetic poles, one period of the detent torque curve Ta corresponds to an angular range of about 25.71° as described above, and is $\frac{1}{2}$ of the period of drive torque curve Tb.

The detent torque becomes zero at points O, I, F in FIG. 13. The rotor 5 is stable in the points O, F, whereas the rotor 5 is unstable in the point I. The detent torque has its maximum value at angular points defined as $25.71° \times \frac{1}{4} = 6.42°$ and $25.71° \times \frac{3}{4} = 19.28°$. It is assumed as with the first embodiment that the angular displacement $\theta r$ ($=2\alpha$) required for the rectangular prism 4 on the rotor 5 to effect light path switching is $\theta r = 20°$. The first stopper 8 is angularly located at a position (corresponding to the point A in FIG. 13) which is angularly displaced $\theta 1'$ from the first stable point 0 on the detent torque curve Ta, so that the rotor 5 will not swing back from the point A under the detent torque. Therefore, the rotor 5 can return into abutment against the first stopper 8 under the detent torque, and is kept in the point A. The angle $\theta 1'$ which determines the first stop point or the point A is preferably $\theta 1' \leq \theta s/4 = 6.42°$. The second stop position (corresponding to the point D) is angularly displaced $\theta 2'$ back from the stable point F, the angle $\theta 2'$ being $\theta 2' \leq \theta s/4 = 6.42°$. The rotor 5 is stable at a point E on the drive torque curve Tb, and unstable at a point J on the drive torque curve Tb. The stable point E on the drive torque curve Tb and the stable point F on the detent torque curve Ta are angularly displaced $\theta 0$ from each other, and the angular difference $\theta 0$ preferably meets the condition of $\theta 2' > \theta 0$.

When no current flows through the coil 18, therefore, the rotor 5 is held in the first stop position or the point A by the first stopper 8. A light ray bearing certain information introduced from the optical fiber 1 through the fiber collimator 1a is reflected by the reflecting surfaces 4b, 4c of the rectangular prism 4 into the optical fiber 3 through the fiber collimator 3a. Then, an electric current flows through the coil 18, generating a drive torque. Since the drive torque is much larger than the detent torque, the rotor 5 is subjected to the torque at a point B. Since the rotor 5 is unstable at the point B, the rotor 5 is turned by the drive torque which varies from the point B toward the point E along the drive torque curve Tb. However, because the second stopper 9 is angularly positioned in advance of the point E, the rotor 5 actually abuts against the second stopper 9. Accordingly, the rotor 5 is stopped and held at the point C after it has turned through $\theta r$. When the current supplied to the coil 18 is then cut off, only the detent torque is applied to the rotor 5, which is angularly held at a point D under the detent torque which varies along the detent torque curve Ta toward the next stable point F. The rotor 5 is now held in the second stop position. With the rotor 5 in the second stop position, the light ray is transmitted from the optical fiber 1 to the optical fiber 2 through the rectangular prism 4.

As described above, the rotor 5 is stably held at either the first stop position or the second stop position even when the coil 18 is de-energized. No electric power is consumed when the rotor 5 is in the first and second stop positions.

To turn the rotor 5 back to the first stop position in order to optically decouple the optical fibers 1, 2 from each other and optically couple the optical fibers 1, 3 to each other, an electric current is passed in the opposite direction through the coil 18. The drive torque is now produced in the opposite direction as indicated by the broken-line curve in FIG. 13. The rotor 5 is turned under the drive torque which varies from a point G, where the rotor 5 is unstable, to a point H. At the time the rotor 5 reaches the angular position corresponding to the point H, the coil 18 is de-energized. Since no drive torque is applied, the rotor 5 is only subjected to the detent torque at the point A, and held in the first stop position. The rotor 5 is in an angular position corresponding to a point K when the drive torque is at the point C or G.

In order for the rotor 5 to be reliably held in the first and second stop positions, therefore, the following conditions must be met:

$$\theta 1' \leq \theta s/4, \theta 2' \leq \theta s/4, \theta 2' > \theta 0$$

$$|CK| = |GK| > |DK>$$

In the second embodiment, $$\theta 1' = 2° < \theta s/4 = 25.71°/4 = 6.42°$$
$$\theta 2' = 3.71° \leq \theta s/4 = 6.42°$$
$$\theta r = 20°$$
$$\theta s = 25.71° = \theta 1' + \theta 2' + \theta r$$

The condition $|CK| = |GK| > |DK|$ is concerned with the selection of the magnitude of the drive torque in the opposite directions, and may be achieved by suitably selecting the number of turns of the coil 18 and the magnitude of an electric current to be supplied to the coil 18.

While the rotor 5 in the modified electromagnetic transducer actuator has 14 magnetic poles, the present invention is not limited to that number of magnetic poles, but the number of magnetic poles on the rotor 5 may suitably be selected.

According to the second embodiment, as described above, the prism can be held in either the first stop position or the second stop position solely under the detent torque. Therefore, electric power is consumed only when the prism 4 is angularly moved for light path switching, and no electric power is consumed to keep the prism in the first and second stop positions. The electromagnetic transducer actuator is of a reduced electric power requirement, and does not produce an appreciable amount of heat in operation. Even if an increased number of optical switches are employed in an application, no practical problem arises as to electric power consumption and heat generation. Since an optical switch employs only one coil, the optical switch is small in size, and a driver circuit needed to energize and deenergize the coil is simple in structure.

Figure 14:
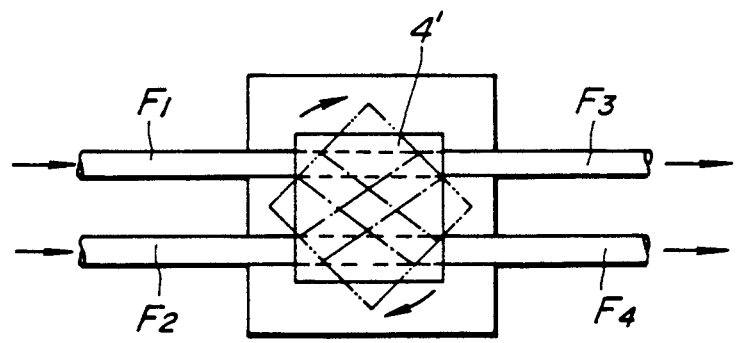
FIG. 14 is a schematic plan view of another application in which the optical switch of the second embodiment is employed.

In each of the first and second embodiments, the optical switch is employed not only to select alternate light paths through the first optical fiber, the prism, and the second optical fiber and through the first optical fiber, the prism, and the third optical fiber. However, the present invention is also applicable to an optical switch as shown in FIG. 14 which employs a cube-shaped prism 4' that is rotatable in the direction indicated by the arrows to optically decouple optical fibers F1, F3 from each other and optically couple optical fibers F1, F4 to each other, and at the same time to optically decouple optical fibers F2, F4 and optically coupled optical fibers F2, F3.

FIGS. 15 through 20 illustrate an optical switch according to a third embodiment of the present invention.

Figure 17:
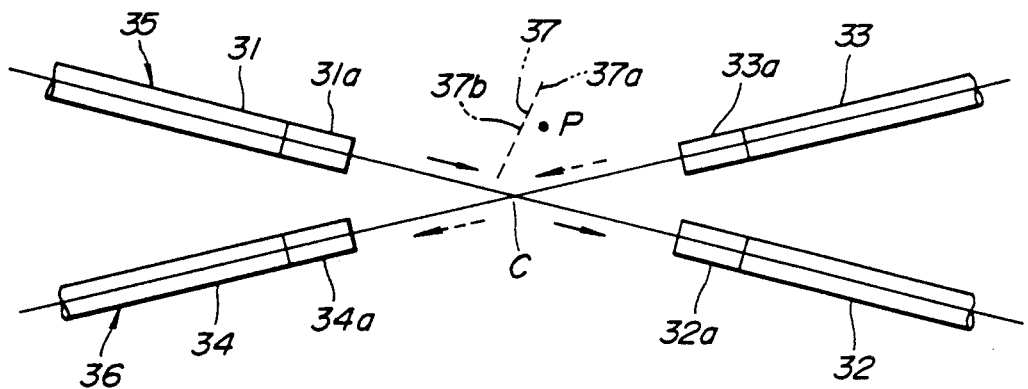
FIG. 17 is a schematic view showing a particular mode of operation of the optical switch shown in FIG. 15.
Figure 18:
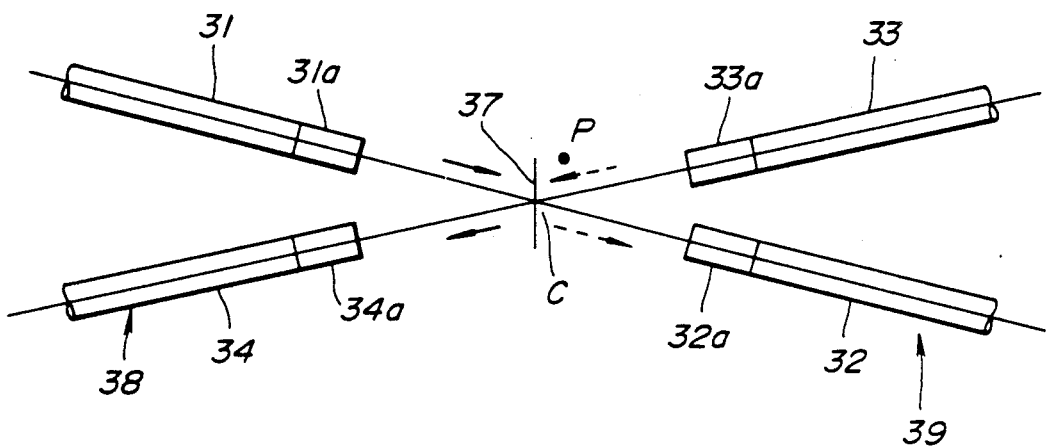
FIG. 18 is a schematic view showing another particular mode of operation of the optical switch shown in FIG. 15.

As shown in FIGS. 17 and 18, the optical switch comprises first, second, third, and fourth optical fibers 31, 32, 33, 34 lying in one plane, and fiber collimators 31a, 32a, 33a, 34a disposed at the entrance/exit ends of the optical fibers 31, 32, 33, 34, respectively. The first and second optical fibers 31, 32 are aligned with each other and jointly constitute a first light transmission path 35 for transmitting a light ray from the first optical fiber 31 to the second optical fiber 32. The third and fourth optical fibers 33, 34 are aligned with each other and jointly constitute a second light transmission path 36 for transmitting a light ray from the third optical fiber 33 to the fourth optical fiber 34.

The first and second light transmission paths 35, 36 are linearly arranged and intersect at a substantially intermediate point C (switching point) between the fiber collimators 31a, 32a, 33a, 34a. A movable reflector 37 in the form of a reflecting mirror is positioned in the same plane as that in which the optical fibers 31 through 34 are disposed, and can be brought into a position between the fiber collimators 31a through 34a when it is angularly moved through a predetermined angle. The reflecting mirror 37 comprises a flat double-faced reflecting mirror angularly movable about a point P spaced from the point C. The reflecting mirror 37 has two reflecting surfaces 37a, 37b. Normally, the reflecting mirror 37 is placed out of the position between the first and second light transmission paths 35, 36 as shown in FIG. 17. When the reflecting mirror 37 is angularly moved into and stopped in the position between the first and second light transmission paths 35, 36, it optically decouples the first and second optical fibers 31, 32 from each other and also the third and fourth optical fibers 33, 34 from each other, and optically couples the first and fourth optical fibers 31, 34 to each other and also the third and second optical fibers 33, 32 to each other. The first and fourth optical fibers 31, 34 thus optically coupled to each other serve as a third light transmission path 38, and the third and second optical fibers 33, 32 thus optically coupled to each other serve as a fourth light transmission path 39, as shown in FIG. 18. The optical switch according to the third embodiment is preferably used as an interface between two independent optical communication network systems, with the second and third optical fibers 32, 33 coupled to one of the network systems and the first and fourth optical fibers 31, 34 coupled to the other network system. In the event of a failure of the other network system, the reflecting mirror 37 is positioned such that the reflecting surface 37a is placed exactly on the point C. Therefore, a light ray carrying optical information and coming from the third optical fiber 33 is transmitted back to the second optical fiber 32 through the fourth light transmission path 39, so that any substantial light loss is prevented at the reflecting mirror 37 and the light ray that has returned through the fourth light transmission path 39 can be effectively transmitted to another network system. At the same time, a light ray from the first optical fiber 31 is reflected by the reflecting surface 37b of the reflecting mirror 37 back into the fourth optical fiber 34. While the reflected light ray is subjected to some loss because the reflecting surface 37b is not positioned exactly at the point C owing to the thickness of the mirror 37, it is still strong enough to allow a self diagnosis of the malfunctioning network system.

Figure 15:
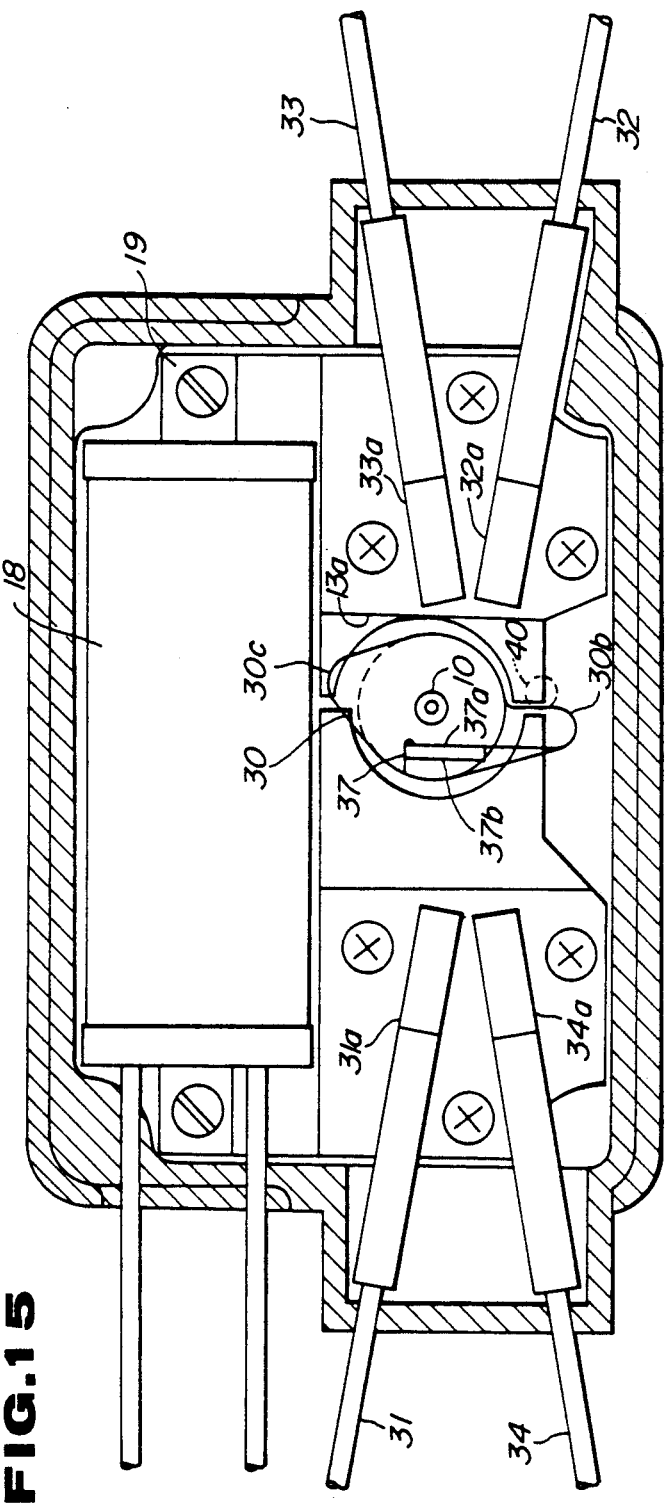
FIG. 15 is a plan view, partly in cross section, of an optical switch according to a third embodiment of the present invention.
Figure 16:
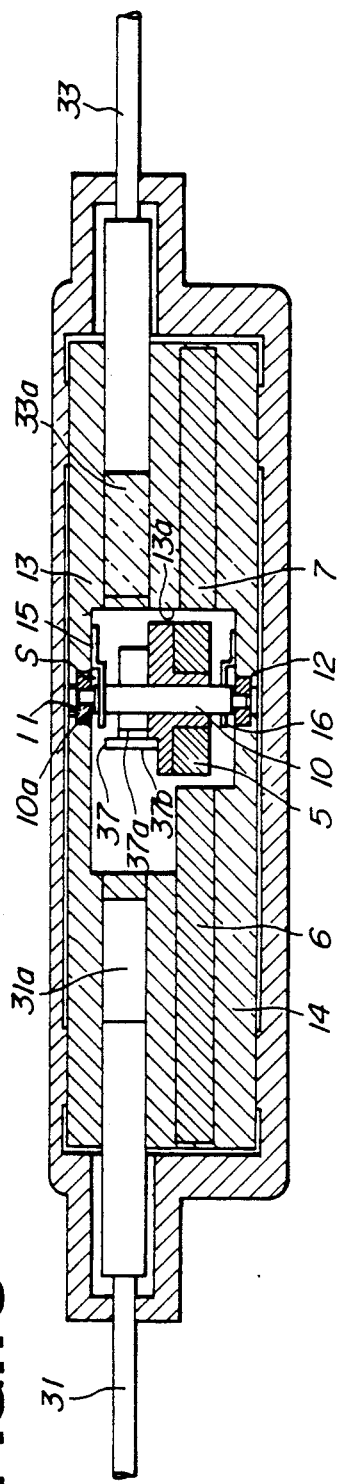
FIG. 16 is a vertical cross-sectional view of the optical switch shown in FIG. 15.

The optical switch of the third embodiment is shown in detail in FIGS. 15 and 16. The reflecting mirror 37 may be angularly moved by the actuator according to the first or second embodiment of the present invention.

Figure 19:
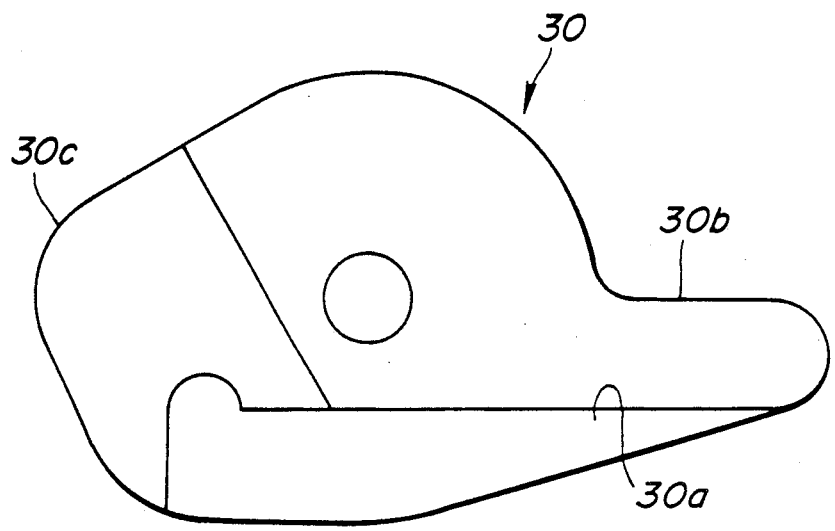
FIG. 19 is a plan view of a support for a movable reflector used in the optical switch shown in FIG. 15.
Figure 20:
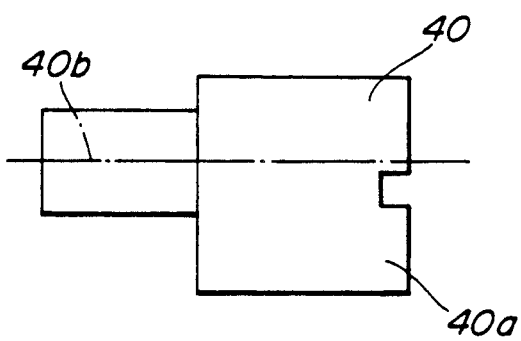
FIG. 20 is a side elevational view of a stopper in the optical switch shown in FIG. 15.
Figure 22A:
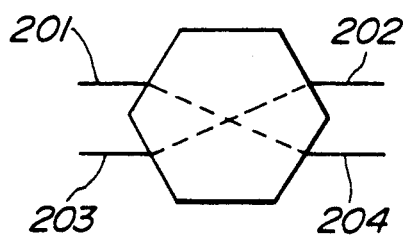
FIGS. 22(a) and 22(b) are schematic views of another conventional optical switch.
Figure 22B:
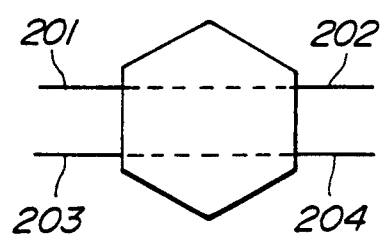
Figure 21:
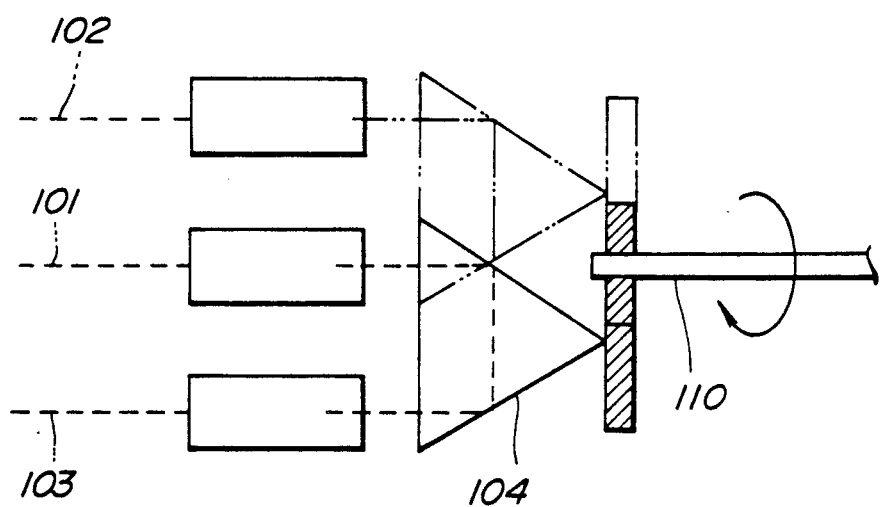
FIG. 21 is a schematic view of a conventional optical switch.

The reflecting mirror 37 is mounted on a support 30 of aluminum which has a configuration as shown in FIG. 19 when viewed in plan. The support 30 includes a support region 30a on which the reflecting mirror 37 is disposed. The support 30 also has abutments 30b, 30c which can be brought into abutment against first and second stoppers, respectively, under some torques to hold the entire rotary assembly including the reflecting mirror 37 stably in stop positions. The second stopper comprises an end 13a of the upper plate 13 or a casing of the optical switch. The first stopper comprises an eccentric screw 40 (FIG. 20) having a shank 40b positioned eccentrically with respect to a screw head 40a engageable by the abutment 30b, the screw 40 being threaded in the casing of the optical switch. Therefore, the first stopper is positionally adjustable.

The reflecting mirror 37 is angularly movable preferably through 40°.

With the arrangement of the third embodiment, the alternate light paths provided by the optical fibers can be selected by angularly moving the reflecting mirror. Since the reflecting mirror is lighter than the comparable prism, the optical switch is less heavy and can respond to switching commands with higher response. The optical switch is also highly reliable since it does not undergo interfacial reflections which would otherwise occur with the prisms.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An optical switch comprising:
   at least one optical fiber exit terminal disposed in a plane;
   at least first and second optical fiber entrance terminals disposed in said plane;
   a movable reflector disposed in said plane and angularly movable about a point in said plane for reflecting and/or refracting a light ray from said optical fiber exit terminal selectively into one of said first and second optical fiber entrance terminals for thereby optically coupling said optical fiber exit terminal and said one optical fiber entrance terminal; and
   actuator means for angularly moving said movable reflector;
   said actuator means including a disc-shaped magnetized rotor supporting said movable reflector thereon, said disc-shaped magnetized rotor being swingably mounted for swinging movement in said plane for angularly moving said movable reflector, and electromagnetic stator means which is demagnetizable for allowing a detente torque to be applied to turn said rotor to at least one stable angular position with respect to said electromagnetic stator means and which is also magnetizable for applying a drive torque in excess of the detente torque in and around said stable angular position to said rotor to turn the rotor from said stable angular position.

2. An optical switch according to claim 1, wherein said movable reflector has two reflecting surfaces extending perpendicularly to each other and an entrance/exit surface confronting said two reflecting surfaces, the arrangement being such that the light ray from said optical fiber exit terminal is introduced into said movable reflector through said entrance/exit surface, reflected by said reflecting surfaces, and emitted from said movable reflector through said entrance/exit surface into said one optical fiber entrance terminal, for thereby providing a light transmission path.

3. An optical switch according to claim 2, wherein said movable reflector comprises a rectangular prism.

4. An optical switch according to claim 2, wherein said entrance/exit surface of said movable reflector is arranged at an angle relative to said optical fiber entrance and exit terminals when said rotor is at said angular position $\theta a$.

5. An optical switch according to claim 1, further including first stopper means for stopping said rotor at an angular position $\theta a$ in advance of said stable angular position while said rotor is still being subjected to a torque when said rotor is turned toward said stable angular position under said detent torque with said electromagnetic stator means being nonmagnetized, for thereby optically coupling said optical fiber exit terminal and said first optical fiber entrance terminal to each other, thus providing a first light transmission path.

6. An optical switch according to claim 5, further including second stopper means for stopping said rotor at an angular position $\theta b$ ($\theta a < \theta b$) spaced from said stable angular position while said rotor is still being subjected to a torque when said rotor is turned under said drive torque with said electromagnetic stator means being magnetized, for thereby optically coupling said optical fiber exit terminal and said second optical fiber entrance terminal to each other, thus providing a second light transmission path.

7. An optical switch according to claim 6, wherein said disc-shaped magnetized rotor has at least a pair of magnetic poles disposed in diametrically opposite relation to each other across a central axis thereof, said electromagnetic stator mean comprising two stators diametrically confronting each other around said rotor with a pair of minimum gaps defined between said stators and said rotor to establish said stable angular position, said detent torque having a magnitude cyclically varying through an angular interval of 180° from a reference angle 0° corresponding to said stable angular position, said drive torque having a magnitude cyclically varying through said angular interval from an angle which differs from said reference angle 0° by an angular interval $\theta 0$, said drive torque being larger than said detent torque in an angular range of at least from 0° to 45° and applied in the opposite direction to said detent angle.

8. An optical switch according to claim 7, wherein said rotor is angularly movable between said angular positions $\theta a$, $\theta b$ through an angle of 20° ($=\theta b - \theta a$), said angular positions $\theta a$, $\theta b$ being in the range of: $0° < \theta a < \theta b < 45°$.

9. An optical switch according to claim 6, wherein said disc-shaped magnetized rotor has an odd number of pairs of at least two magnetic poles ($2p$) disposed in diametrically opposite relation to each other across a central axis thereof ($2p = 2(2m-1)$, where p is the number of pairs of the magnetic poles and m = 1, 2, 3, ...), said electromagnetic stator means comprising two stators diametrically confronting each other around said rotor with a pair of minimum gaps defined between said stators and said rotor to establish said stable angular position, said detent torque having a magnitude cyclically varying through an angular interval of T ($T=360°/2p$) from a reference angle 0° corresponding to said stable angular position, said drive torque having a magnitude cyclically varying through said angular interval from an angle which differs from said reference angle 0° by a predetermined angular interval, the absolute value of the magnitude of said drive torque being larger than the absolute value of the magnitude of said detent torque in an angular range of at least from 0° to θc ($3T/4 \leq \theta c < T$).

10. An optical switch according to claim 9, wherein said angular position θa at which said rotor is stopped by said first stopper means is in the range of: $0° < \theta a < T/4$.

11. An optical switch according to claim 9, wherein said electromagnetic stator means is also demagnetizable to allow the detent torque to be applied to turn said rotor from an angular position of 3T/4, which is ¾ of the angular interval T from said reference angle 0°, toward a second angular position corresponding to the angular interval T, said angular position θb at which said rotor is stopped by said second stopper means being in the range of: $3T/4 < \theta b < \theta c$.

12. An optical switch according to claim 11, wherein said rotor has 14 magnetic poles, said rotor being angularly movable between said said angular positions θa, θb through an angle of 20° ($=\theta b - \theta a$), said angular positions θa, θb being the range of: $2° < \theta a < \theta b < 22°$.

13. An optical switch according to claim 1, further comprising a second optical fiber exit terminal, said first optical fiber entrance terminal and said first-mentioned optical fiber exit terminal being aligned with each other in coaxially confronting relation in said plane across an intermediate point therebetween, thereby jointly providing a first light transmission path, said second optical fiber entrance terminal and said second optical fiber exit terminal being aligned with each other in coaxially confronting relation in said plane across said intermediate point therebetween, thereby jointly providing a second light transmission path, said first and second light transmission paths intersecting with each other, said movable reflector being angularly movable into alignment with said intermediate point for reflecting a light ray from at least said first-mentioned optical fiber exit terminal into said second optical fiber entrance terminal, thus providing a third light transmission path.

14. An optical switch according to claim 13, wherein said movable reflector comprises a flat member having opposite reflecting surfaces, the arrangement being such that when said movable reflector is in alignment with said intermediate point, said third light transmission is provided through one of said reflecting surfaces, and said second optical fiber exit terminal, the other reflecting surfaces, and said first optical fiber entrance terminal jointly providing a fourth light transmission path.

15. An optical switch according to claim 1, wherein said actuator means further includes a rotatable shaft supporting said rotor, and means for biasing said shaft at upper and lower ends thereof.

16. An optical switch according to claim 1, including a support member supporting said reflector thereon and which is provided between the magnetized rotor and the reflector.

17. An optical switch according to claim 16, wherein said magnetized rotor is connected to a bottom surface of said support member.

18. An optical switch according to claim 17, including a rotatable shaft supporting the magnetized rotor thereon; and said magnetized rotor, said movable reflector and said support member collectively have a center of gravity which is positioned substantially on the rotatable shaft.

19. An optical switch according to claim 1, wherein said stator means is disposed below said magnetized rotor.

* * * * *

UNITED STATES PATENT AND TRADEMARK OFFICE
CERTIFICATE OF CORRECTION

PATENT NO. : 5,000,534

DATED : March 19, 1991

INVENTOR(S) : Watanabe et al.

It is certified that error appears in the above-identified patent and that said Letters Patent is hereby corrected as shown below:

On cover page at [73] Assignees: change "Nippon Sheet Glass Co., Ltd.; Citizen Watch Co., Ltd., both of Tokyo, Japan" to -- Nippon Sheet Glass Co., Ltd. Osaka, Japan; Citizen Watch Co., Ltd. of Tokyo, Japan --.

Column 2, line 18, after "optical" insert -- switch --;

Column 2, line 61, after "displacement" change "o" to -- $\alpha$ --.

Column 4, line 7, change "it" to --its --.

Column 9, line 18, change "$|CK| = |GK| > |DK>$" to -- $|CK| = |GK| > |DK|$ --.

Column 12, line 22, change "nonmagnetized" to -- demagnetized --;

Column 12, line 40, change "mean" to -- means --.

Signed and Sealed this

Tenth Day of November, 1992

Attest:

DOUGLAS B. COMER

*Attesting Officer*  *Acting Commissioner of Patents and Trademarks*